UNITED STATES PATENT OFFICE.

HENRY LOBDELL, OF TROY, NEW YORK.

WALL-PAPER.

SPECIFICATION forming part of Reissued Letters Patent No. 10,430, dated December 25, 1887.

Original No. 282,541, dated August 7, 1883. Application for reissue filed November 28, 1883.

*To all whom it may concern:*

Be it known that I, HENRY LOBDELL, a resident of the city of Troy, in the county of Rensselaer and State of New York, have invented certain new and useful Improvements in Wall-Paper; and I do hereby declare that the following is a full, clear, and exact description of the invention, that will enable others skilled in the art to which it appertains to make and use the same.

My invention relates to improvements in wall paper hangings and decorations; and it consists in manufacturing or preparing wall-paper with a dry sizing or adhesive substance on its unprinted surface ready for use, thereby producing a new article of manufacture.

The objects of my invention are hereinafter fully set forth.

Heretofore it has been the practice in manufacturing or preparing wall-paper for the market to leave the back side of the paper blank, rendering it necessary for the paper-hanger to prepare the paper for use at the place where it has to be used by applying wet paste or sizing to its blank surface. The wet paper was then hung upon the wall, to which the paste caused it to adhere. My method is to manufacture or prepare the paper ready for use with a dry sizing on the unprinted surface of the paper. The sizing may be applied to the paper in the form of liquid solution, upon which the paper is floated and withdrawn upon suitable supports for drying the solution, which adheres to the paper and forms, when dry, a coating of dry sizing upon the paper. I prefer, however, the method employed by paper-manufacturers in applying colored sizing to the face of wall-paper in the process of color-printing, and it can be so applied in a liquid form by means of a grounding brush machine or a single-color blotching printing-machine. After the wet sizing has been applied to the paper, the latter is run over heated pipes, or suitable supports, and dried, when it becomes dry-sized paper.

I do not wish to limit myself to any particular method or process of applying the sizing. Any of the well-known methods of dry-sizing may be employed. My object is to provide a new article of manufacture, consisting of wall-paper dry-sized on its back or unprinted surface in a condition to be shipped and supplied to the trade ready for use.

In the use of wall-paper manufactured as last above described, it is only necessary for the hanger to moisten the sized surface and apply it to the wall.

The paper and paste are thus manufactured or prepared and supplied to the trade as a single new and easily-distinguished article of manufacture, ready for use without the intervention of any other manufactured ingredient.

By applying the sizing to the paper in its manufacture or preparation for the market at the factory, instead of by the hanger at the place where it is used, a more uniform distribution of the sizing upon the surface of the paper is secured, which gives the paper a smoother and more finished appearance upon the wall. As it is only necessary to moisten the dry sizing to cause it to adhere to the wall, and not to saturate the paper, as was the case with all wall-papers heretofore manufactured, the paper does not expand or stretch before being applied to the wall and shrink again when dry, as heretofore. As the expansion and shrinkage varied in different parts of the paper, it caused the figures and designs on the printed surface of the paper to mismatch on the edges of adjoining rolls of paper.

In all papers heretofore manufactured the uneven drying and shrinking of the paper on calcimined walls would pull off the calcimine in places and loosen the paper. When the paper is manufactured and prepared as I have described, it is not wet sufficiently in hanging to discolor its printed surface after drying again, as is the case with all papers heretofore manufactured.

My paper can be hung upon a wall or ceiling much more conveniently and quickly than paper manufactured in any other way, and the cost is not greater than the combined cost of unsized paper and the paste or wet sizing heretofore used.

I am able to use much thinner and cheaper paper in the manufacture of my dry-sized wall-paper, for the reason that it is not weakened in hanging by being saturated with moisture.

It is well known to those skilled in the art that the thinner the paper the better the results in hanging, provided only the paper has sufficient strength to resist tearing. It is equally well known that wall-paper manufactured in the usual manner with dull or soft sizing on the printed surface cannot be hung without disturbing or changing its colored surface or print, and that the figures of embossed wall-paper are injured in hanging; but when the paper is manufactured or prepared with the dry sizing, as I have described, the color and figures are fully preserved.

In hanging my dry-sized wall-paper, the edges of the paper rolls or strips can be successfully abutted edge to edge without leaving open seams, caused in other papers by expansion and shrinkage, and the edges of the rolls can be pressed down closely upon the wall without danger of forcing the paste out upon the adjoining roll.

By the word "sizing" I intend to include any adhesive substance—as dextrine, glue, paste, or gums—suitable for the purposes described.

What I claim as new, and desire to secure by Letters Patent, is—

As a new article of manufacture, dry-sized wall-paper manufactured or prepared substantially as described, and for the purposes set forth.

In testimony whereof I have hereunto set my hand this 19th day of November, 1883.

HENRY LOBDELL.

Witnesses:

GEO. A. MOSHER,

JOHN T. BOOTH.